United States Patent
Posselius et al.

(10) Patent No.: US 9,297,688 B2
(45) Date of Patent: Mar. 29, 2016

(54) WEIGHING ROUND BALES

(71) Applicant: CNH AMERICA LLC, New Holland, PA (US)

(72) Inventors: John H. Posselius, Ephrata, PA (US); Kevin M. Smith, Narvon, PA (US); Douglas S. Fitzkee, Ephrata, PA (US); Robrecht M. K. Dumarey, Gistel (BE); Bart M. A. Missotten, Winksele (BE); Didier O. M. Verhaeghe, Ypres (BE)

(73) Assignee: CNH Industrial America LLC, New Holland, PA (US)

( * ) Notice: Subject to any disclaimer, the term of this patent is extended or adjusted under 35 U.S.C. 154(b) by 539 days.

(21) Appl. No.: 13/725,117

(22) Filed: Dec. 21, 2012

(65) Prior Publication Data
US 2014/0174303 A1     Jun. 26, 2014

(51) Int. Cl.
*G01G 17/00* (2006.01)
*A01F 15/07* (2006.01)
*A01F 15/08* (2006.01)

(52) U.S. Cl.
CPC ................ *G01G 17/00* (2013.01); *A01F 15/07* (2013.01); *A01F 15/08* (2013.01); *A01F 15/0833* (2013.01); *A01F 2015/0808* (2013.01); *A01F 2015/0891* (2013.01)

(58) Field of Classification Search
CPC ................... A01F 15/0833; A01F 2015/0808; A01F 2015/0891; A01F 15/07; A01F 15/08; G01G 17/00
USPC ................ 100/4, 7, 43, 45, 88; 702/102, 139; 56/341; 53/399, 397; 177/136
See application file for complete search history.

(56) References Cited

U.S. PATENT DOCUMENTS

| | | | |
|---|---|---|---|
| 4,362,097 A | 12/1982 | Rogers | |
| 4,603,379 A | 7/1986 | Strosser et al. | |
| 4,742,880 A * | 5/1988 | Schrag et al. | 177/136 |
| 5,581,976 A | 12/1996 | Underhill | |
| 6,295,797 B1 | 10/2001 | Naaktgeboren et al. | |
| 6,313,414 B1 * | 11/2001 | Campbell | 177/16 |
| 6,370,852 B1 | 4/2002 | Ohlemeyer et al. | |
| 6,378,276 B1 * | 4/2002 | Dorge et al. | 53/502 |
| 6,644,006 B1 | 11/2003 | Merritt et al. | |
| 6,688,092 B2 | 2/2004 | Anstey et al. | |
| 6,877,304 B1 | 4/2005 | Smith et al. | |
| 7,166,808 B2 | 1/2007 | Viaud et al. | |
| 7,703,391 B2 * | 4/2010 | Duenwald et al. | 100/35 |
| 8,326,563 B2 * | 12/2012 | Kraus | 702/102 |
| 2002/0029542 A1 | 3/2002 | Davis et al. | |
| 2004/0089483 A1 | 5/2004 | Viaud et al. | |
| 2004/0250703 A1 * | 12/2004 | Viaud et al. | 100/87 |
| 2007/0175341 A1 | 8/2007 | Roberts | |

(Continued)

FOREIGN PATENT DOCUMENTS

| | | | |
|---|---|---|---|
| CA | 2450970 A1 | 5/2004 | |
| CA | 2439869 A1 | 6/2004 | |

(Continued)

*Primary Examiner* — Jimmy T Nguyen
(74) *Attorney, Agent, or Firm* — Patrick M. Sheldrake (57) ABSTRACT

Embodiments relate to weighing a bale formed by a round baler. One or more load cells, but not including load cells at each support of the baler, are used to obtain a measurement of the baler containing the bale and a measurement of the baler empty. Factors related to the slope of the surface on which the baler is located, the size of the bale, and the shape of the bale are used to adjust the measured weight of the bale.

15 Claims, 10 Drawing Sheets

(56) References Cited

U.S. PATENT DOCUMENTS

| | | |
|---|---|---|
| 2009/0217827 A1 | 9/2009 | Duenwald et al. |
| 2009/0223196 A1 | 9/2009 | Smith |

FOREIGN PATENT DOCUMENTS

| | | | |
|---|---|---|---|
| CA | 2467331 | A1 | 11/2004 |
| CA | 2467376 | A1 | 11/2004 |
| CA | 2540781 | A1 | 12/2006 |
| DE | 20005963 | U1 | 6/2000 |
| DE | 10338349 | A1 | 8/2004 |
| EP | 1029440 | A1 | 8/2000 |
| EP | 1034695 | A1 | 9/2000 |
| EP | 1480024 | A1 | 11/2004 |
| EP | 1480025 | A1 | 11/2004 |
| EP | 1508268 | A1 | 2/2005 |
| EP | 1832156 | A1 | 12/2007 |
| EP | 1832157 | A1 | 12/2007 |
| FR | 2741236 | A1 | 5/1997 |

* cited by examiner

WEIGHING ROUND BALES

TECHNOLOGY FIELD

The present invention relates generally to weighing round bales, and more particularly to a weighing system incorporated within a round baler for the weighing of a bale formed therein.

BACKGROUND

For many years agricultural balers have been used to consolidate and package crop material to facilitate the storage and handling of the crop material for later use. Usually, a mower-conditioner cuts and conditions the crop material for windrow drying in the sun. When the cut crop material is properly dried, a baler, for example a round baler, travels along the windrows to pick up the crop material and form it into cylindrically-shaped round bales.

More specifically, pickups of the baler gather the cut and windrowed crop material from the ground, then convey the cut crop material into a bale-forming chamber within the baler. A drive mechanism operates to activate the pickups, augers, and a rotor of the feed mechanism. A conventional baling chamber may include a pair of opposing sidewalls with a series of belts that rotate and compress the crop material into a cylindrical shape.

When the bale has reached a desired size and density, a wrapping system may wrap the bale to ensure that the bale maintains its shape and density. For example, a net may be used to wrap the bale of crop material. A cutting or severing mechanism may be used to cut the net once the bale has been wrapped. The wrapped bale may be ejected from the baler and onto the ground by, for example, raising a tailgate of the baler. The tailgate is then closed and the cycle repeated as necessary and desired to manage the field of cut crop material.

A weighing system incorporated in the baler that provides weight measurements of the formed bale is desired. Such a system is desirable to eliminate use of a separate scale, while also providing weight measurements to the operator of the baler and customers soon after completion of forming the bale.

This document describes an apparatus and processes for weighing round bales.

SUMMARY

Embodiments of the present invention provide methods for weighing a bale formed by a round baler, and a round baler with a processing unit coupled to one or more load sensors and one or more inclinometers for determining a weight of a bale.

In one embodiment, a method of weighing a bale formed by a baler includes: obtaining one or more bale weight measurements, with one or more load sensors, of the baler with a formed bale contained therein; obtaining one or more empty baler weight measurements, with the one or more load sensors, of the baler empty; and determining, by a processing unit in communication with the one or more load sensors, a corrected bale weight by adjusting a first bale weight, the first bale weight a function of the one or more bale weight measurements and the one or more empty baler weight measurements; wherein the first bale weight is adjusted based upon one or more of (i) one or more slopes on a surface on which the baler is positioned; (ii) a size of the bale; and (iii) a shape of the bale.

According to an embodiment, a round baler is comprised of: a main frame with a main support beam on which a pair of wheels are rotatably affixed, each wheel comprising a wheel axle, the main frame including a bale forming chamber in which a bale is formed; a tailgate pivotally connected to the main frame, the tailgate configured to pivot open to discharge a formed bale; at least one load sensor, each of the at least one load sensor positioned at a respective wheel axle for measuring a weight force exerted thereon, wherein the at least one load sensor obtains the following measurements: one or more bale weight measurements of the baler with a formed bale contained therein; and one or more empty baler weight measurements of the baler empty; and a processing unit coupled to the at least one load sensor, the processing unit configured to calculate a weight of the bale by: determining a corrected bale weight by adjusting a first bale weight, the first bale weight a function of the one or more bale weight measurements and the one or more empty baler weight measurements; wherein the first bale weight is adjusted based upon one or more of (i) one or more slopes on a surface on which the baler is positioned; (ii) a size of the bale; and (iii) a shape of the bale.

According to an embodiment, the one or more bale weight measurements and the one or more empty baler weight measurements are obtained at fewer than each support position of the baler.

According to an embodiment, the one or more bale weight measurements are obtained during a wrap cycle of the formed bale.

According to an embodiment, the one or more empty baler weight measurements are obtained during a tailgate close cycle.

According to an embodiment, the one or more slopes comprises one or more of a front-to-back angle and a side-to-side angle of the baler.

A first of the one or more load sensors is positioned at a first wheel axle of the baler, and a second of the one or more load sensors is positioned at a second wheel axle of the baler, in one embodiment. In this embodiment, the front-to-back angle and the side-to-side angle are obtained with respective inclinometers, the inclinometers in communication with the processing unit. According to various aspects, the corrected bale weight is determined by adjusting the first bale weight based upon the front-to-back angle and the side-to-side angle of the baler and the size of the bale; and wherein the size of the bale is a function of a center of gravity location of the bale.

In another embodiment, the one or more load sensors comprises a single load sensor positioned at one of a first wheel axle or a second wheel axle of the baler. The front-to-back angle is obtained with an inclinometer in communication with the processing unit, and the side-to-side angle is determined based upon the empty baler weight measurements in which a tailgate of the baler is in two known positions. The corrected bale weight is determined by adjusting the first bale weight based upon the front-to-back angle and the side-to-side angle of the baler, the size of the bale, and the shape of the bale; wherein the size of the bale is a function of a center of gravity location of the bale; and wherein the shape of the bale is a function of the density of the bale at more than one bale shape sensor positioned in the baler.

According to an embodiment, a display interface connected to the processing unit is configured to display on a monitor an indication of the corrected bale weight.

In another embodiment, a method of weighing a bale formed by a baler comprises: obtaining one or more bale weight measurements, with one or more load sensors each positioned at a respective wheel axle of the baler, of the baler with a formed bale contained therein; obtaining one or more empty baler weight measurements, with the one or more load sensors, of the baler empty; and determining, by a processing unit in communication with the one or more load sensors, a corrected bale weight by adjusting a first bale weight of the bale, the first bale weight a function of the one or more bale weight measurements and the one or more empty baler weight measurements based upon a front-to-reverse slope and a side-to-side slope of a surface on which the baler is positioned and a correction factor based upon one or more of (i) a size of the bale; and (ii) a side-to-side shape of the bale.

In an embodiment, a tailgate closing switch in communication with the tailgate is configured to indicate when the tailgate is closed. In this embodiment, the one or more empty baler weight measurements are obtained during a tailgate close cycle.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIGS. 3A-7B show side and rear views of measurement configurations of the exemplary round baler, according to embodiments;

DETAILED DESCRIPTION OF ILLUSTRATIVE EMBODIMENTS

Embodiments of the present invention relate to weighing a round bale formed by a round baler. In addition to utilizing one or more load cells or sensors to obtain a measurement of the baler containing the bale, factors related to adjusting the weight based on angles of inclination of the baler and the size, shape, and location of the bale are taken into account to achieve an accurate bale weight determination.

Agricultural balers, such as round balers, are well known in the agricultural industry, and the instant invention can be used with substantially any of such machines. Reference is made, for example, to U.S. Pat. Nos. 6,877,304; 6,688,092; 6,644,006; and 6,295,797 that illustrate such balers, the disclosures of which are incorporated herein by reference in their entirety. For illustrative purposes, details of an exemplary round baler in which the features of the present invention may be used are disclosed in and will be described here in part with reference to U.S. Pat. No. 5,581,976, which is also hereby incorporated by reference in its entirety.

Figure 1:
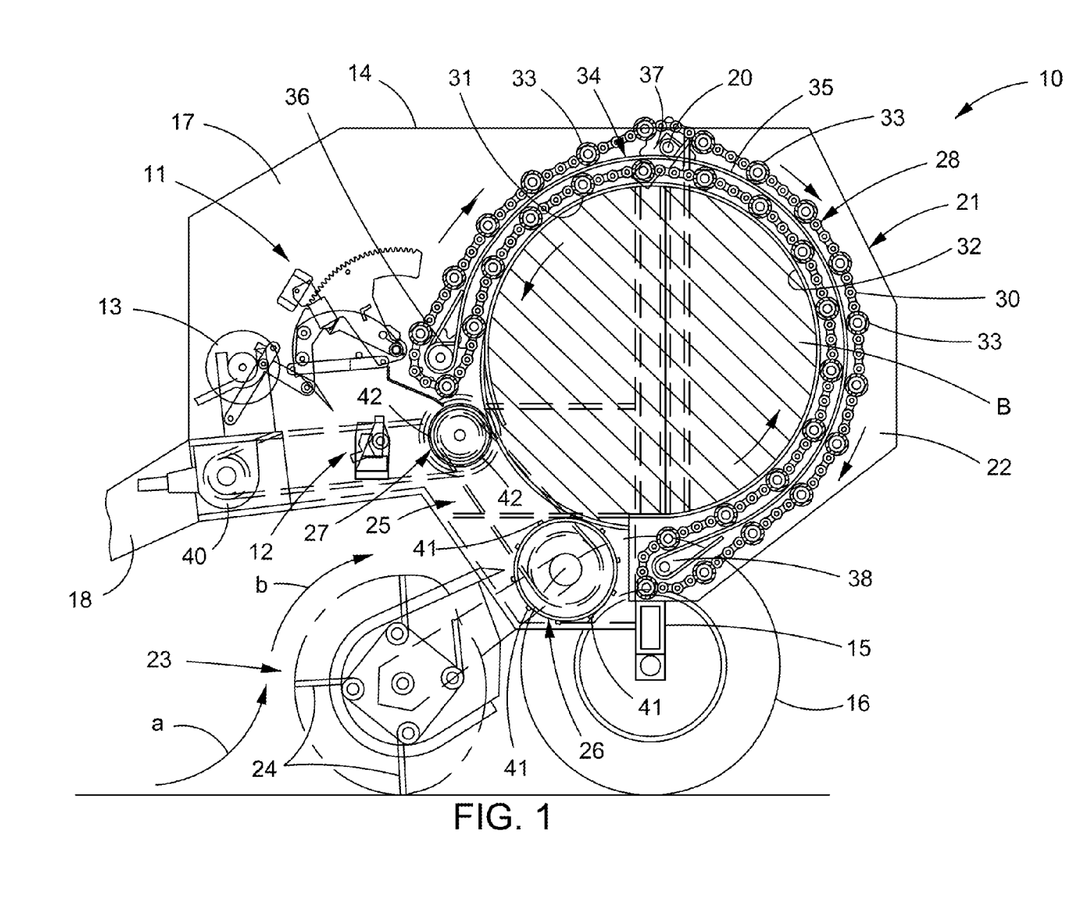
FIG. 1 is a cutaway side elevational view of an exemplary round baler in which the present invention may be employed.

FIG. 1 depicts an exemplary agricultural round baler, generally designated 10, in which embodiments of the present invention may be employed. As previously noted, crop in the field is usually arranged in a windrow as it is engaged by the baler 10 being pulled along the windrow of cut crop material by a tractor (not shown).

FIG. 1 shows a fixed chamber round baler 10 having a wrapping system for wrapping a cylindrical package of crop material (not shown) formed in a round baler 10. More particularly, the wrapping system of baler 10 comprises a net dispensing assembly 11 and a cutting assembly 12 for cutting web material, such as net, issued from a supply roll 13.

As shown, round baler 10 includes a main frame 14 with a main support beam 15 on which a pair of wheels 16 (only one shown) are rotatably affixed. The main frame includes a pair of side walls between which a cylindrical bale forming chamber extends. For the purposes of clarity only one wall 17 is shown in FIG. 1 and the elements mounted inwardly thereof are shown in full lines for clarity, which is an approach not uncommon in the descriptions in patents. For illustrative purposes reference letter B is used to designate a bale, shown in cross section in the chamber.

Baler 10 also includes a tongue 18 extending from the forward portion of main frame 14 for conventional connection to a tractor (not shown). Pivotally connected to the sidewalls of main frame 14 by a pair of stub shafts 20 is tailgate 21 which may be closed (as shown in FIG. 1) during bale formation or pivoted open about stub shafts 20 to discharge a completed bale. The tailgate includes tailgate walls 22 coextensive with side walls 17. A pickup assembly 23 mounted on main frame 14 in a suitable manner includes a plurality of fingers or tines 24 moveable in a predetermined path to lift crop material from the ground, generally depicted by direction arrow a, and deliver it rearwardly (arrow b) toward a transverse inlet 25 in the chamber defined by a floor roll 26 and a transverse stripper roll 27, both of which rolls are rotatably supported on mainframe 14 between sidewalls 17.

As shown, the bale forming chamber is defined primarily by an apron assembly 28 comprising a pair of support chains 30 mounted to travel along a continuous path, the inner run of which is defined on sidewalls 17 and tailgate walls 22 by front and rear sections 31, 32 of a continuous chain guide track that separates at a point of track adjacent the stub shaft 20 during bale discharge. The apron further comprises a plurality of parallel tubular crop engaging slats 33 extending between chains 30 to provide a cage-like periphery of the cylindrically shaped chamber. Radially outward of the inner run of apron assembly 28 are front and rear sections 34, 35 of continuous cylindrical bale chamber wall. These sections, also separable during bale discharge, are mounted between side walls 17 and tailgate walls 22, respectively, for maintaining integrity between the outer and inner runs of chain 30. Operatively engaged with chain 30 are drive sprocket 36 mounted between sidewalls 17, idler sprockets 37 also mounted between sidewalls 17 on shaft 20, and idler sprocket 38 mounted between tailgate walls 22. A conventional chain drive system for drive sprocket 36 is provided via appropriate coupling to gearbox 40 in a conventional manner, diagrammatically depicted in phantom outline outwardly of sidewall 17. The bale forming chamber is further defined by the outer conveying surfaces of floor roll 26 and stripper roll 27, both of which are driven in a direction opposite that of the bale chamber direction by conventional drive means appropriately coupled to gear box 40. In FIG. 1, floor roll 26 receives bale material at its forward surface, moving the bale material upward and rearward, clockwise as shown in FIG. 1. Bale material leaves the floor roll 26 and enters the bale chamber which rotates moving the bale material from a lower position, rearward and upward in a circular motion, counterclockwise as shown in FIG. 1. These rolls 26, 27 may be provided with ribs 41, 42 to enhance their ability to convey crops in the chamber as a bale is being formed. Other forms of aggressive surface structure may be used to accommodate various types of crops and conditions.

Figure 2A:
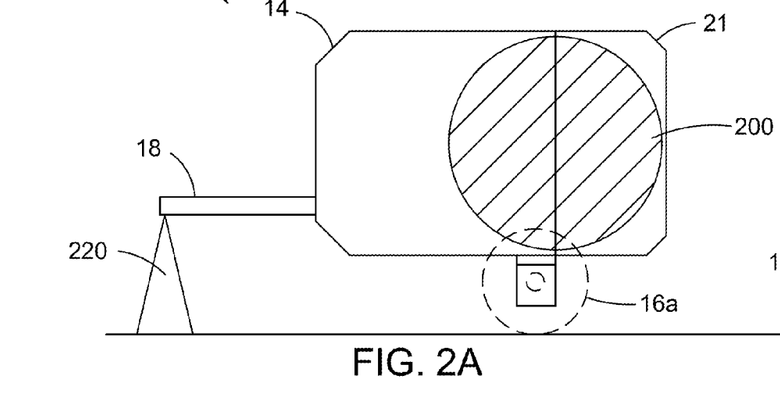
FIGS. 2A, 2B, and 2C show a side, top, and rear view, respectively, of an exemplary round baler.
Figure 2B:
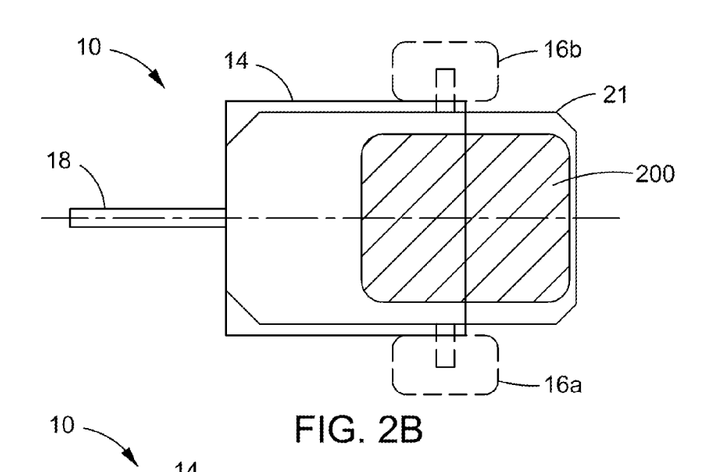
Figure 2C:
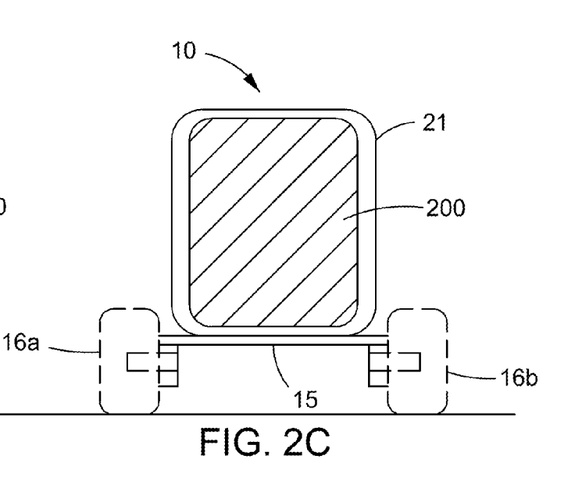

FIGS. 2A, 2B, and 2C show a side, top, and rear view, respectively, of the exemplary round baler 10, in a simplified form for purposes of describing the bale weighing process of the present invention. Shown are the main frame 14, the tailgate 21, the tongue 18, the main support beam 15 on which the pair of wheels 16 (16a, 16b) are affixed, and a coupling point 220 at which the baler 10 is coupled to a tractor. A bale 200, formed by operation of the baler 10 as described above, is also shown in FIGS. 2A, 2B, and 2C.

It is desired by operators to accurately determine the weight of the bale 200 without moving the bale 200 to a special location for performing such a measurement. It is also desirable to obtain weight measurements without using load sensors at each supporting point of the baler 10 (i.e., each wheel and the hitch). Thus, various features relating to the bale 200 and/or to the baler 10 are taken into account to determine a correction factor to apply to weight measurements taken of the baler 10 with the bale 200 contained therein.

According to an embodiment, since the bale weighing process is desirably performed on-site (e.g., the field on which the bale 200 is formed) when the baler 10 is stationary, features of the site are taken into account when determining the weight of the bale 200. In particular, the ground on which the baler 10 is positioned may not be level; the ground may be inclined an angle "a" with respect to a front-to-reverse direction of the baler 10 and an angle "b" with respect to a side-to-side direction of the baler 10. If the weight of the baler 10 is measured with one or more load cells (but not including a load cell at each support point of the baler 10), for example, the measured weight of the baler 10 may not be accurate if the baler 10 is inclined longitudinally (front-to-reverse) or side-to-side. Moreover, according to further embodiments, the size and shape of the bale 200 may affect the measured weight of the baler 10 obtained using a load cell. In particular, if the shape of the bale is not uniform, a reading on one or more load cells may not accurately represent the weight of the bale 200. Thus, to accurately determine the weight of a bale 200 contained within the baler 10, a weight measurement with a load cell cannot simply be taken; instead, the effect of the angle a and/or angle b, as well as the size and shape of the bale 200, have to be taken into account.

According to embodiments, a correction factor, taking into account how the weight is changed based on either or both angle a and angle b and taking into account the size and/or shape of the bale 200 within the baler 10, is determined. This correction factor is then used to adjust a weight measurement of the bale 200, which is the difference between the measured weight of the baler 10 with the bale 200 and the weight of the baler 10 empty.

Figure 3A:
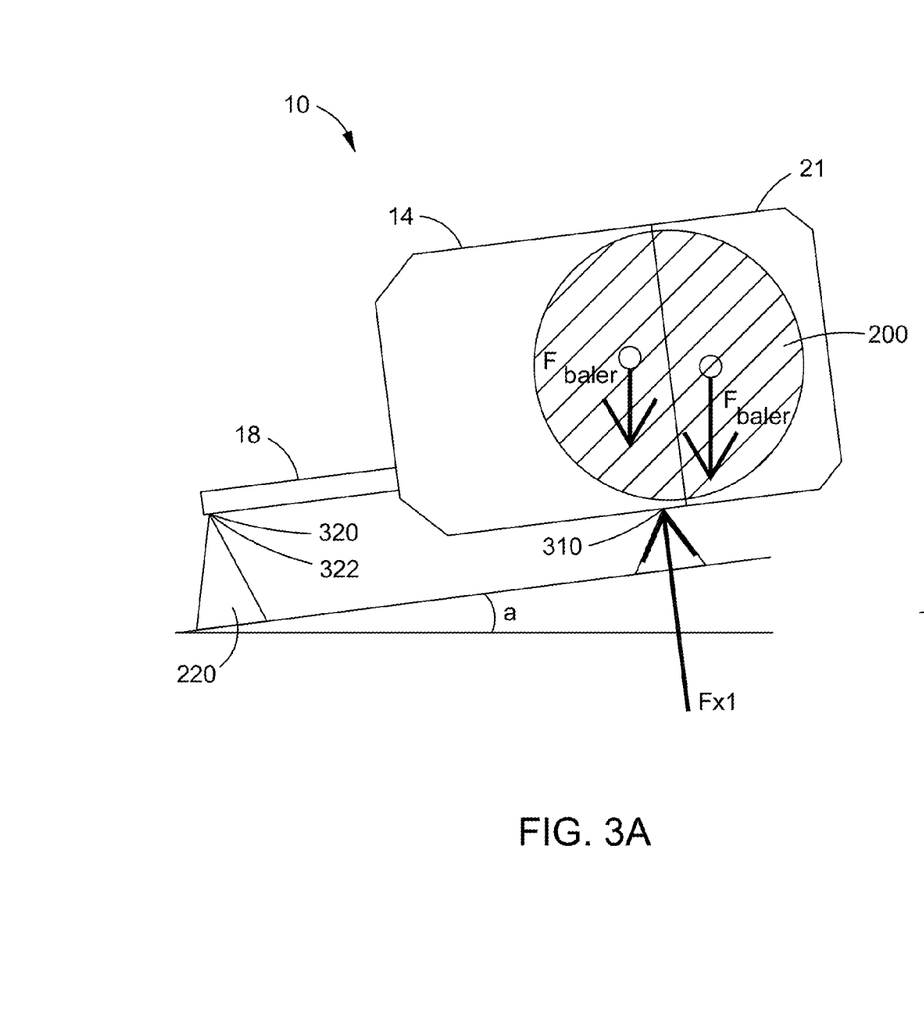
Figure 3B:
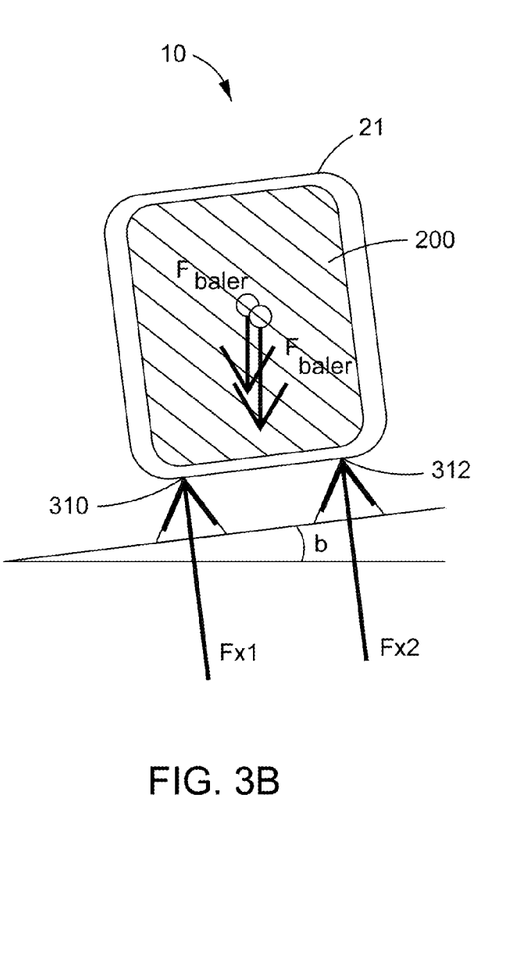
Figure 4A:
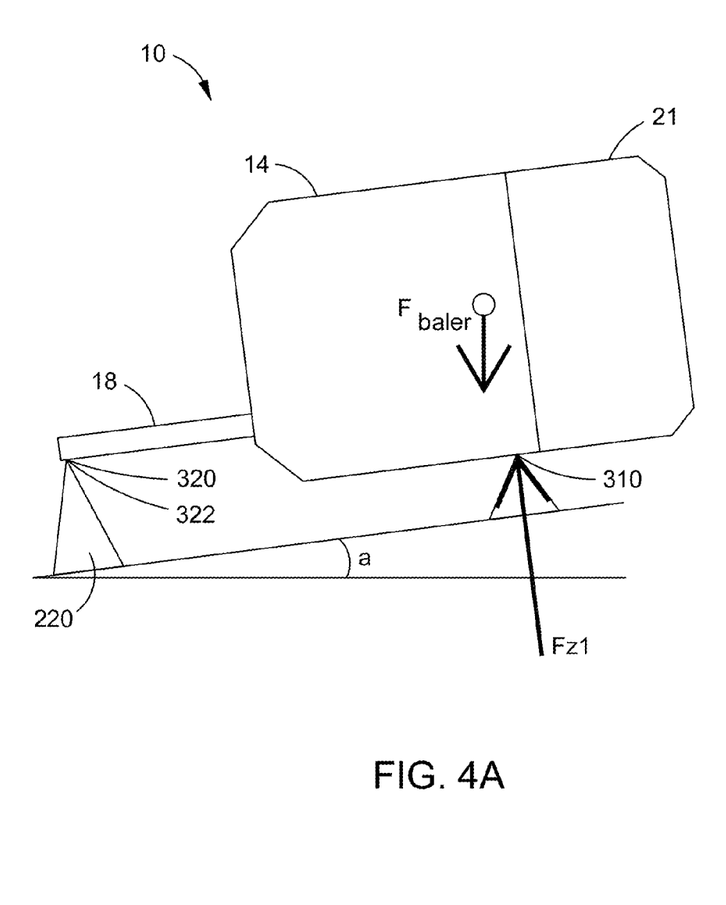
Figure 4B:
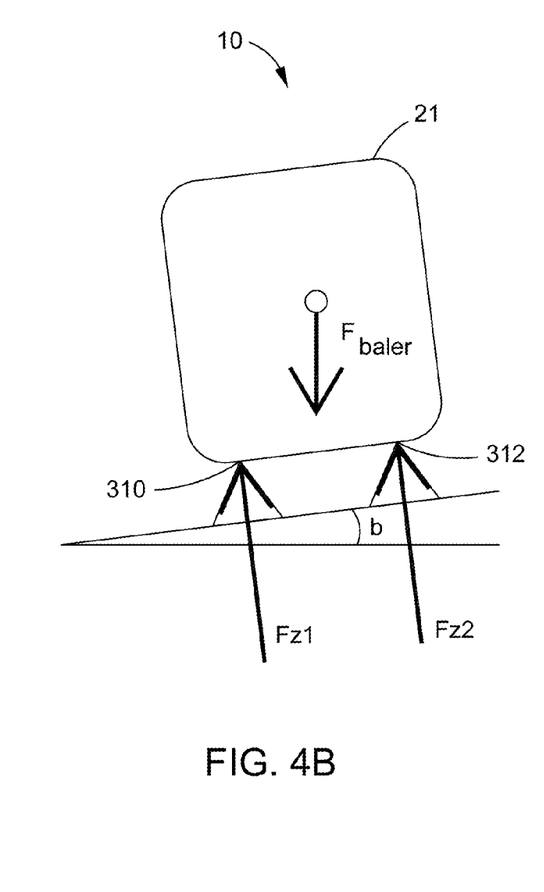

With reference to FIGS. 3A through 4, two load sensors or cells 310 and 312 and two inclinometers 320 and 322 are incorporated into the baler 10 to determine the center of gravity of the baler 10 as well as that of bales 200 formed therein. The load cells 310, 312 measure the weight force exerted thereon; the inclinometer 320 measures the inclination of the baler 10 in a longitudinal direction (i.e., angle a, front-to-back of the baler 10); and the inclinometer 322 measures the inclination of the baler in the lateral direction (i.e., angle b, side-to-side). The load cells 310, 312 may be various types of load cells or sensors available in the field, such as, for example, those produced by Digi-Star that function to measure the weight force and interface the measured weight with one or more display and/or one or more processing units. The inclinometers may be various types of inclinometers available in the field that function to measure the slope or angle of inclination and interface with one or more display and/or one or more processing units. The load cells 310, 312 may be positioned at the wheel axles of the baler 10 at wheels 16a, 16b. Alternatively, one of the load cells 310, 312 may be positioned at the hitch or coupling point 220 of the baler 10. The inclinometers 320 and 322 may be positioned at any location on the baler, for example each may be positioned at the coupling point 220 of the baler 10.

FIGS. 3A and 3B show a side and rear view, respectively, of a first measurement configuration of the baler 10. In the first measurement configuration, the bale 200 is formed and contained within the baler 10, the baler 10 is stationary, and the tailgate 21 is closed. The load cells 310, 312 measure the weight force Fx1, Fx2 exerted thereon, with the total weight force being the sum of the two weight forces. The inclinometer 320 measures the angle a that the baler 10 is inclined in the longitudinal direction. The inclinometer 322 measures angle b in the lateral direction. The measurements may be obtained during a wrap cycle of the formed bale 200 or at another time when the bale 200 is formed.

FIGS. 4A and 4B show a side and rear view, respectively, of a second measurement configuration of the baler 10. In the second measurement configuration, the bale 200 is removed from the baler 10, the baler 10 is stationary, and the tailgate 21 is closed or nearly closed (i.e., open a few degrees). The load cells 310, 312 measure the weight force Fz1, Fz2 exerted thereon, with the total weight force being the sum of the two weight forces. The inclinometer 320 measures the angle a that the baler 10 is inclined in the longitudinal direction. The inclinometer 322 measures angle b in the lateral direction.

In order to determine the load cell reaction due to the bale 200, Fz1 and Fz2 are subtracted from values Fx1 and Fx2. The resultant values equals the load cell reaction due to the bale:

$$F=(Fx1+Fx2)-(Fz1+Fz2).$$

In order to determine the actual bale weight, a correction factor needs to be applied. This correction factor includes adjusting for the slope (angles a and b) and adjusting for the center of gravity of the bale in the baler. The slope correction factor uses simple trigonometric functions to determine the actual reaction load reaction. For instance:

$$F_{slope}=F/\cos a/\cos b.$$

In addition to using the load cells 310 and 312 and the inclinometers 320 and 322 to measure the weight of the bale 200, the size and/or the shape of the bale 200 may be used to determine a size/shape correction value to further adjust the weight of the bale 200. As the bale 200 grows, the center of the bale 200 moves rearward in relation to the baler frame 14. Consequently, when performing weight measurements with one or two load cells, it is important to know the center of gravity location of the bale. The center of gravity location of the bale 200 determines the weight distribution of the bale 200 on the support 220 and the wheels 16a and 16b. As the bale 200 grows in size, more of the bale weight is distributed at wheels 16a and 16b. According to an embodiment, from previously collected data, a relationship may be determined to quantify the center of gravity location of the bale 200 versus the size of the bale 200 in the a direction extending towards the front of the baler 10. This information is used to determine the percentage of the bale's weight on the axle of the baler at wheels 16a, 16b, which is used to determine a correction factor to be applied to the measured weight.

Similarly, the bale shape (e.g., cylindrical or conical) may also be actively measured on the baler 10 to adjust the end weight value of the bale 200. Sensors incorporated within the bale frame 14 may be used to determine the density of the bale 200 at different locations in the bale chamber (e.g., forward portion and end portion of the bale chamber), with the density serving as an indicator of the shape of the bale 200.

The actual bale weight is then determined by adjusting $F_{slope}$ by the bale center of gravity location factor $B_{COG}$. This factor determines the percent weight of the bale on the load cells based on diameter and slope, so that:

Bale Weight=$F_{slope}/B_{COG}$.

According to an additional embodiment, and as an alternate solution to utilizing the correction factor as described above, a single load cell 610 may be incorporated into the baler 10 to determine the weight of bales formed therein. The load cell 610 may be positioned at either of the wheel axles of the baler 10 at wheels 16a, 16b.

Figure 5A:
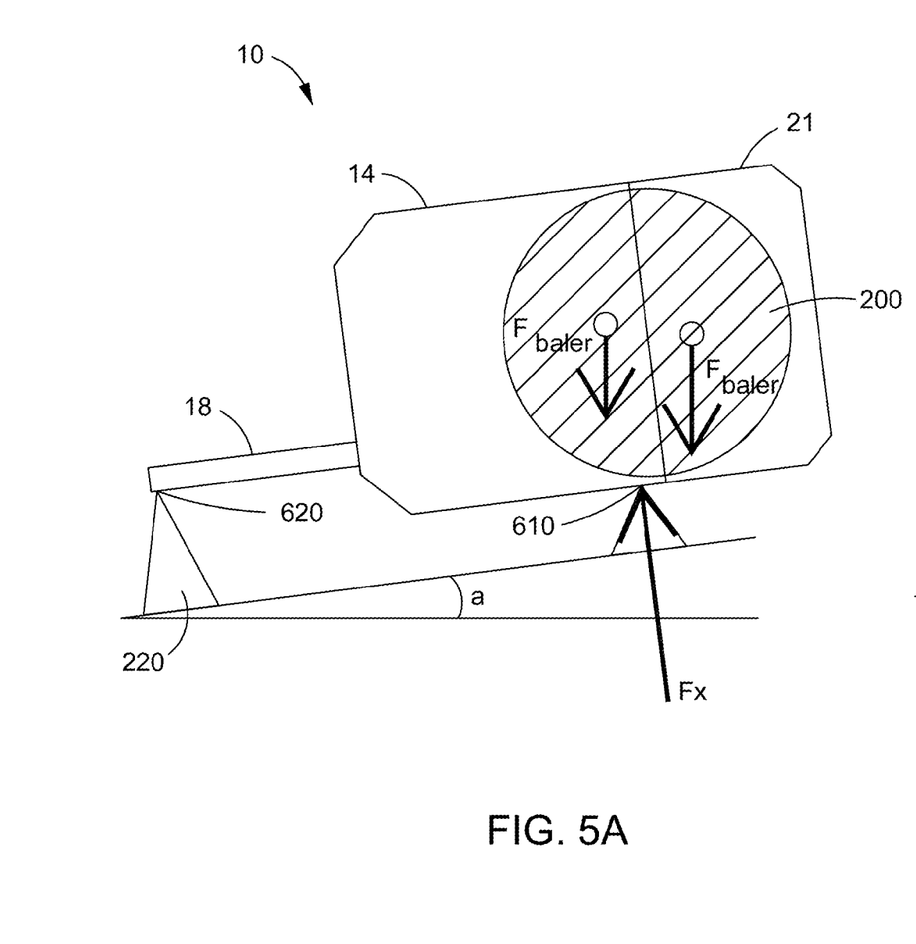
Figure 5B:
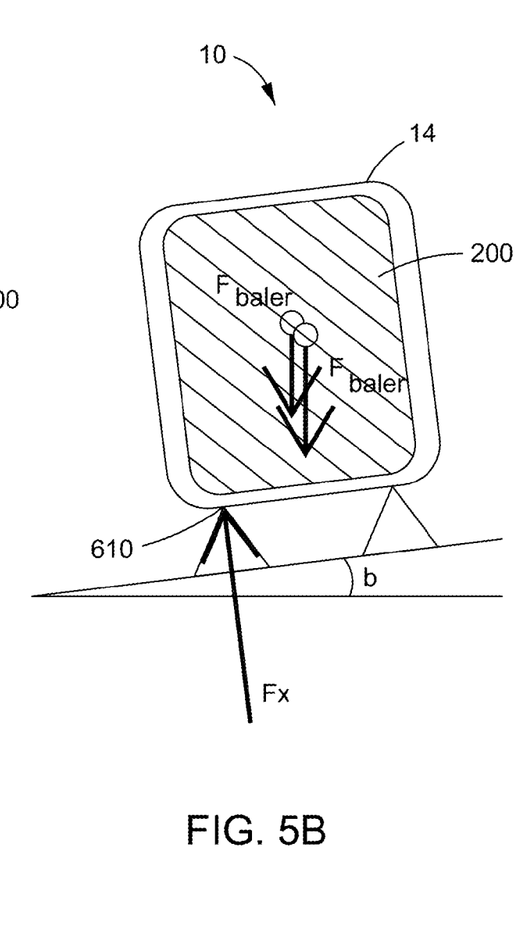

FIGS. 5A and 5B show a side and rear view, respectively, of a first single load sensor measurement configuration of the baler 10. In this configuration, the bale 200 is formed and contained within the baler 10, the baler 10 is stationary, and the tailgate 21 is closed. The load cell 610 measures the weight force Fx exerted thereon. This may be done, for example, during the wrap cycle of the baler 10.

Figure 6A:
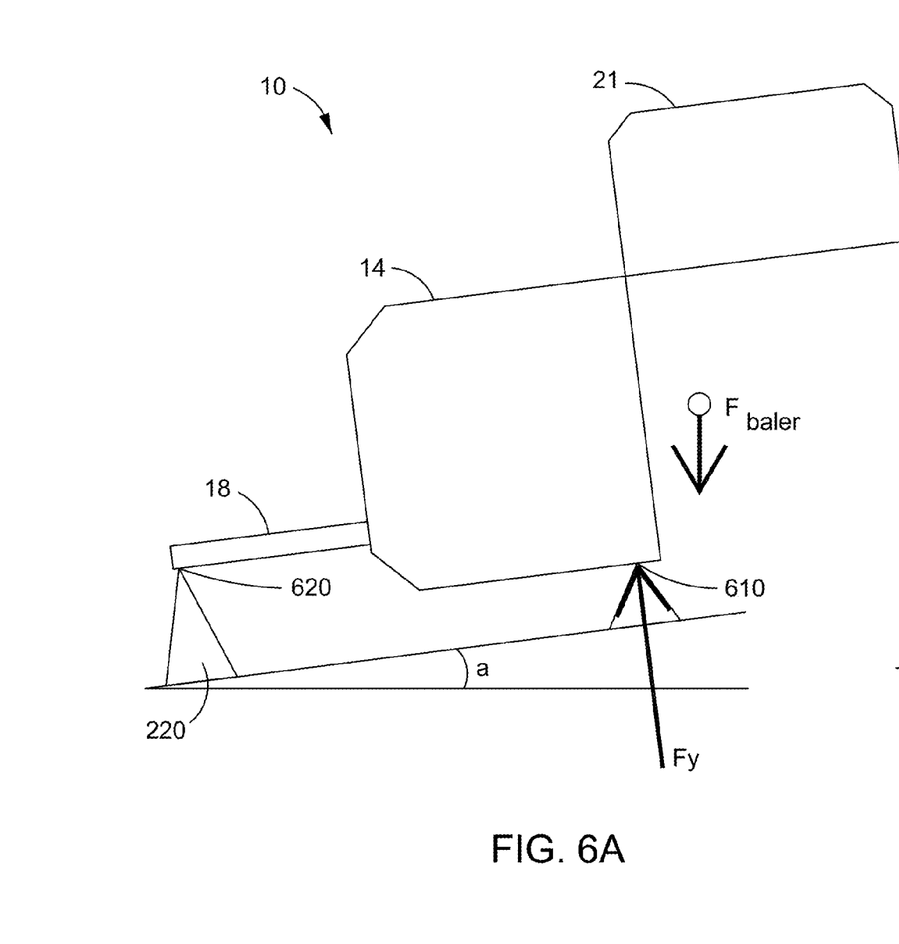
Figure 6B:
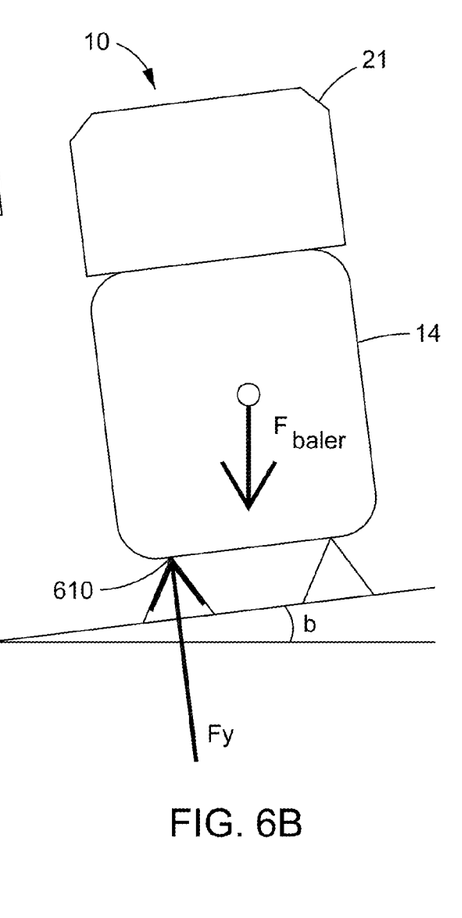

FIGS. 6A and 6B show a side and rear view, respectively, of a second single load sensor measurement configuration of the baler 10. In this configuration, the bale 200 is removed from the baler 10, the baler 10 is stationary, and the tailgate 21 is opened. The load cell 610 measures the weight force Fy exerted thereon.

Figure 7A:
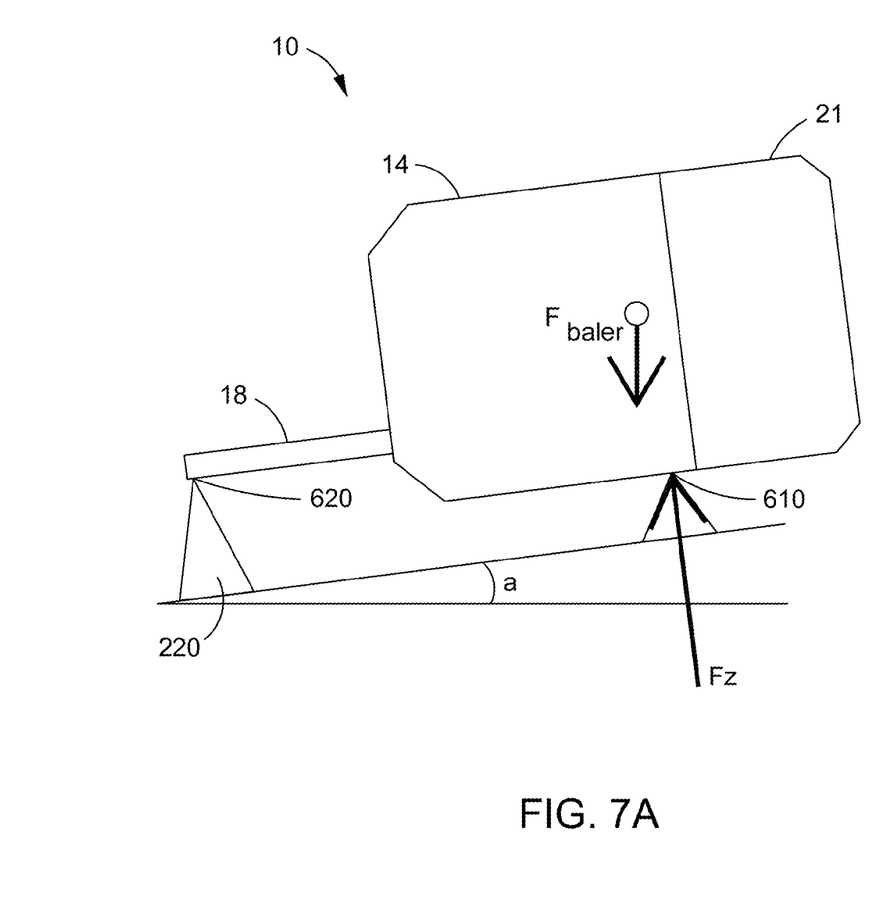
Figure 7B:
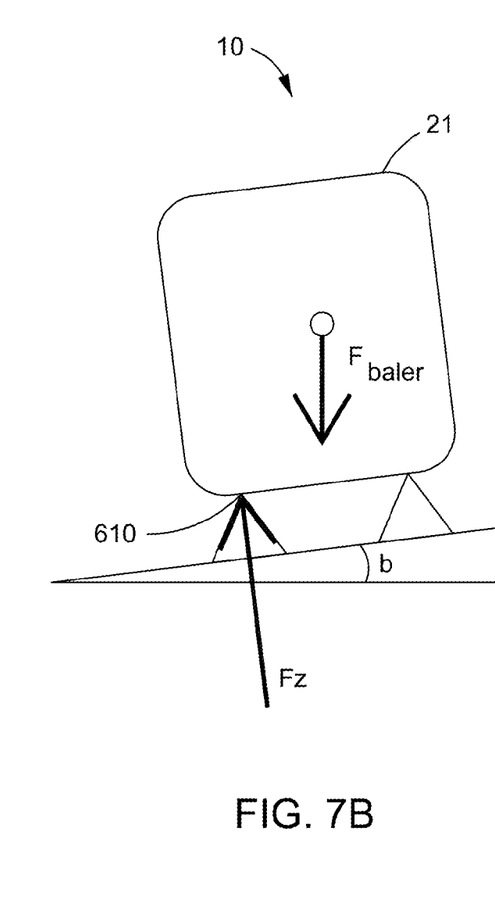

FIGS. 7A and 7B show a side and rear view, respectively, of a third single load sensor measurement configuration of the baler 10. In this measurement configuration, the bale 200 is removed from the baler 10, the baler 10 is stationary, and the tailgate 21 is closed or nearly closed. The load cell 610 measures the weight force Fz exerted thereon. For all 3 measurement configurations, an inclinometer 620 measures the baler longitudinal orientation (angle a, front-to-back).

The weight forces Fy and Fz can be used to determine the angle b with the use of basic trigonometric functions. This is possible as a known mass (tailgate 21) is being moved from one known tailgate position (open) to a second known tailgate position (closed). Once angle b is determined, the bale weight can be determined in a similar manner as the first embodiment. Since only one load cell is used in this embodiment, an additional correction factor is needed based on side-to-side bale shape. This is needed as, for example, a bale that is not cylindrical, rather it is conical, may have more or less than 50% of its weight on the load cell. This bale shape correction factor ($B_{shape}$) is determined by bale shape sensors on the bale. The resultant bale weight calculations are:

$F=Fx-Fz$;

$F_{slope}=F/\cos a/\cos b$; and

Bale Weight=$F_{slope}/B_{COG}/B_{shape}$.

In the example measurement configurations described above, the weight of the baler 10 empty may be based on measurements when the tailgate 21 has moved to the open position and/or when the tailgate 21 has moved to the closed position. This requires that the baler remain stationary for some moments after the tailgate has closed to get an acceptable empty baler weight. In another embodiment, the empty baler weight is based on measurements taken during the closing cycle of the tailgate 21, which provides uniform data as the tailgate 21 is moving through a controlled descent. A tailgate closed switch incorporated in and in communication with the tailgate 21 indicates when the tailgate 21 is closed. According to this embodiment, the empty baler weight is determined based on data obtained during a set amount of time prior to the tailgate switch closing. Since noise is generated in the data at essentially the same time the tailgate switch closes, the useable data may be in a range of approximately 2 seconds to 0.5 seconds prior to the tailgate closing, for example. Other ranges of data may also be used.

Figure 8:
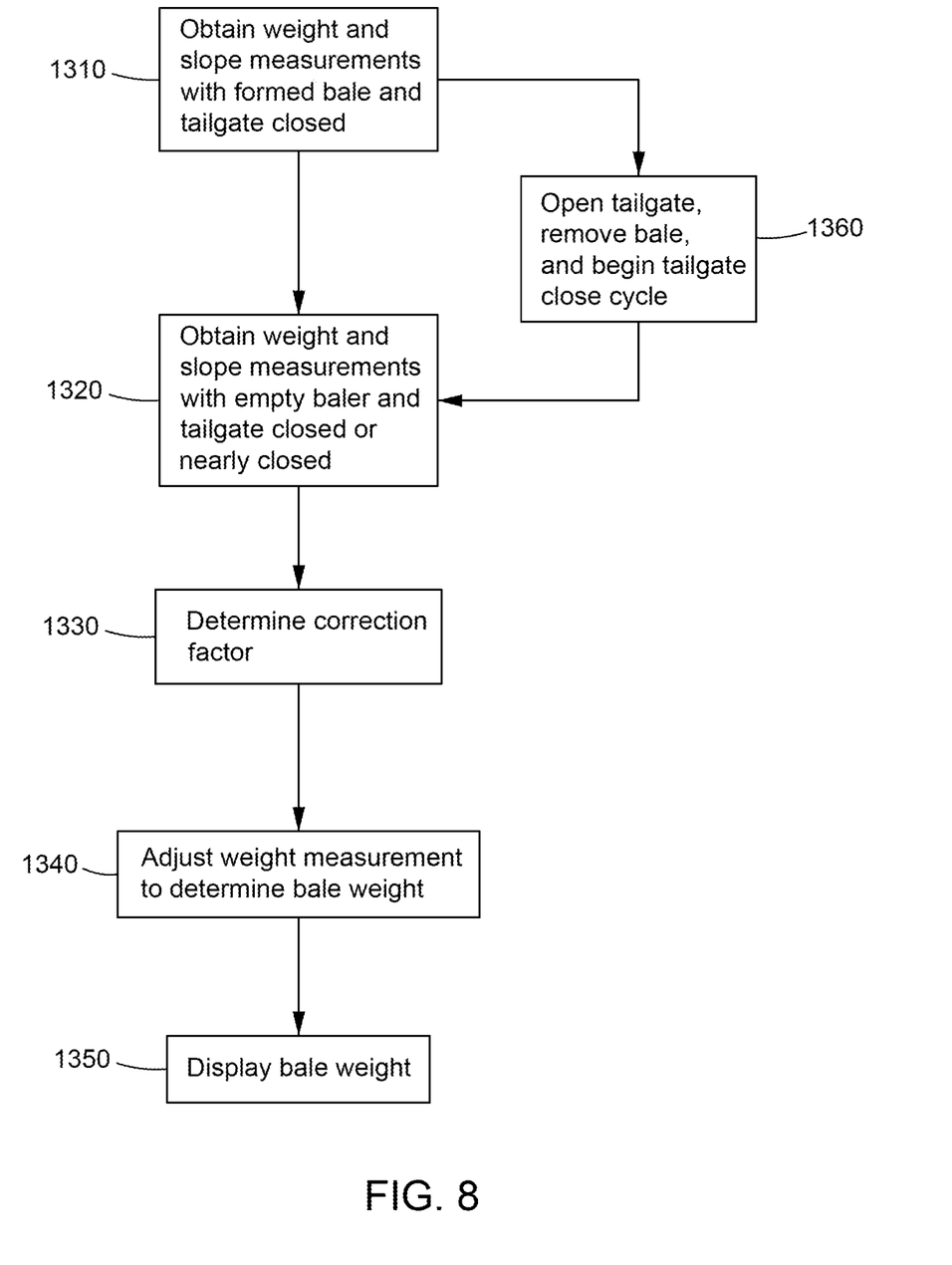
FIG. 8 illustrates a flowchart of an exemplary method of weighing a round bale.

FIG. 8 illustrates a flowchart of an exemplary method of weighing a round bale 200 utilizing the two load sensors or cells 310 and 312 and the inclinometers 320 and 322 as described above with reference to the measurement configurations of FIGS. 3A-4B.

At 1310, at a first measurement configuration of the baler 10 in which the bale 200 is formed and the tailgate 21 of the baler 10 is closed, a weight measurement Fx1, Fx2 of the baler 10 is obtained at the two load cells 310 and 312 and angle measurements a and b of the forward-to-reverse incline and side-to-side incline of the baler 10 are obtained with the inclinometers 320 and 322 (see FIGS. 3A and 3B).

At 1320, when the baler 10 is in a second measurement configuration in which the bale 200 is removed from the baler 10 and the tailgate 21 is closed or nearly closed, a second measurement is obtained with the two load cells 310 and 312 and the inclinometers 320 and 322 (see FIGS. 4A and 4B). The second measurement includes the weight Fz1, Fz2 of the baler 10 and the angles a and b of the forward-to-reverse and side-to-side incline of the baler 10. According to an embodiment, the empty baler weight is based on measurements taken during the closing cycle of the tailgate 21.

At 1330, a correction factor is determined. The correction factor is a function of the forward-to-reverse and side-to-side incline angles a and b of the baler 10, as well as a percentage of the bale weight determined to be on the load cells 310 and 312. This factor is based on bale size and baler orientation.

At 1340, a weight of the bale 200 is determined by adjusting the weight measurement Fx1, Fx2 of the baler. The correction factor is used to adjust the weight measurement.

At 1350, an indication of the weight of the bale 200 may be displayed to an operator of the baler 10 via a monitor in the cab of the baler 10, for example.

At 1360, following 1310, after the weight measurement Fx1, Fx2 is taken, the bale 200 may be removed and the close cycle of the tailgate 21 may begin. The load cells 310 and 312 and/or the inclinometers 320 and 322 may provide an indication (i.e., signal) to a processing device that the measurement is complete, thereby indicating that the tailgate 21 should open and that the formed bale 200 should be ejected, the operation of which may be controlled by a processing device. Alternately, the baler 10 may wait a predetermined amount of time before moving to the second measurement configuration after the bale 200 is formed and/or wrapped.

Figure 9:
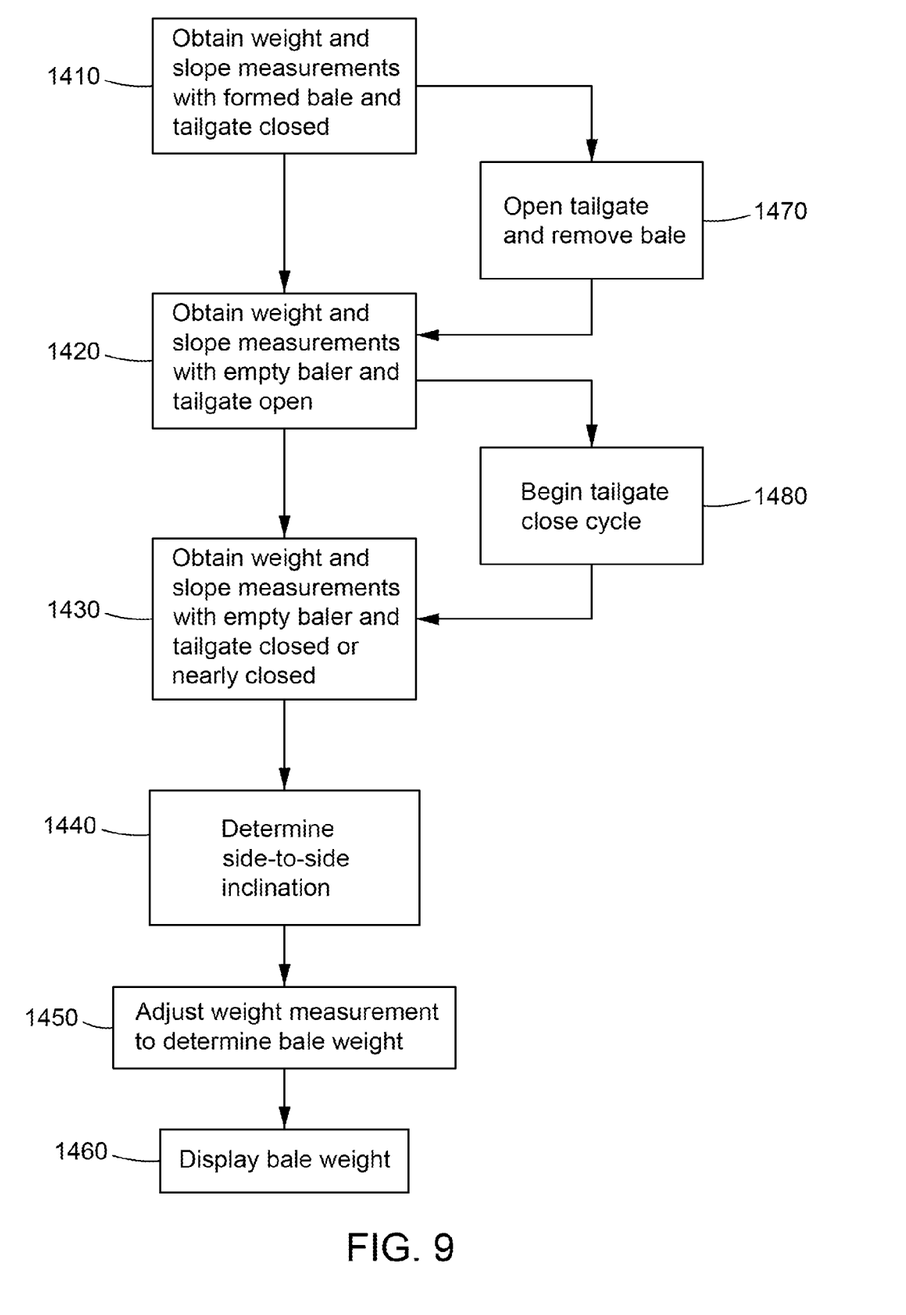
FIG. 9 illustrates a flowchart of another exemplary method of weighing a round bale.

FIG. 9 illustrates a flowchart of another exemplary method of weighing a round bale 200 utilizing the load sensor or cell 610 and the inclinometer 620 as described above with reference to the measurement configurations of FIGS. 5A-7B.

At 1410, when the bale 200 is formed and the tailgate 21 of the baler 10 is closed, a weight measurement Fx of the baler 10 is obtained at the single load cell 610, as is the forward to reverse baler angle a with the inclinometer 620 (see FIGS. 5A and 5B).

At 1420, when the bale 200 is removed from the baler 10 and the tailgate 21 is opened, a first test measurement is obtained with the load cell 610 (see FIGS. 6A and 6B). The first test measurement includes the weight Fy of the baler 10.

At 1430, when the bale 200 is removed from the baler 10 and the tailgate 21 is closed or nearly closed, a second test measurement is obtained with the load cell 610 to obtain the weight Fz of the baler 10 (see FIGS. 7A and 7B).

At 1440, angle b (the side-to-side incline of the baler 10) is determined as a function of the first and second test measurements, Fy and Fz, respectively, of the weight of the baler 10.

At 1450, the known weight of the empty baler 10 is subtracted from Fx to obtain the weight of the bale 200 on the load cell, F. The known weight of the empty baler 10 corresponds to Fz. Angles a and b are used to adjust the weight measurement F of the bale 200, thereby taking into account effects that angles a and b have on the weight measurement. The center of gravity location of the bale 200 and the bale shape are applied to further adjust the bale weight measurement.

At 1460, an indication of the weight of the bale 200 may be displayed to an operator of the baler 10 via a monitor in the cab of the baler 10, for example.

At 1470, following 1410, after the weight measurement Fx is taken, the load cell 610 and/or inclinometer 620 may provide an indication (i.e., signal) to a processing device that the measurements are complete, thereby indicating that the tailgate 21 should be opened and the formed bale 200 should be ejected, the operation of which may be controlled by a processing device. Alternately, a predetermined amount of time may pass before the opening of the tailgate 21 and the ejection of the bale 200.

At 1480, following 1420, after the weight measurement Fy is taken, the tailgate 21 is moved to a closed position. The load cell 610 and/or inclinometer 620 may provide an indication (i.e., signal) to a processing device that the measurement is complete, thereby indicating that the tailgate 21 should begin closing, the operation of which may be controlled by a processing device. Alternately, a predetermined amount of time may pass after the bale 200 is ejected from the baler 10 before the tailgate 21 begins closing.

Figure 10:
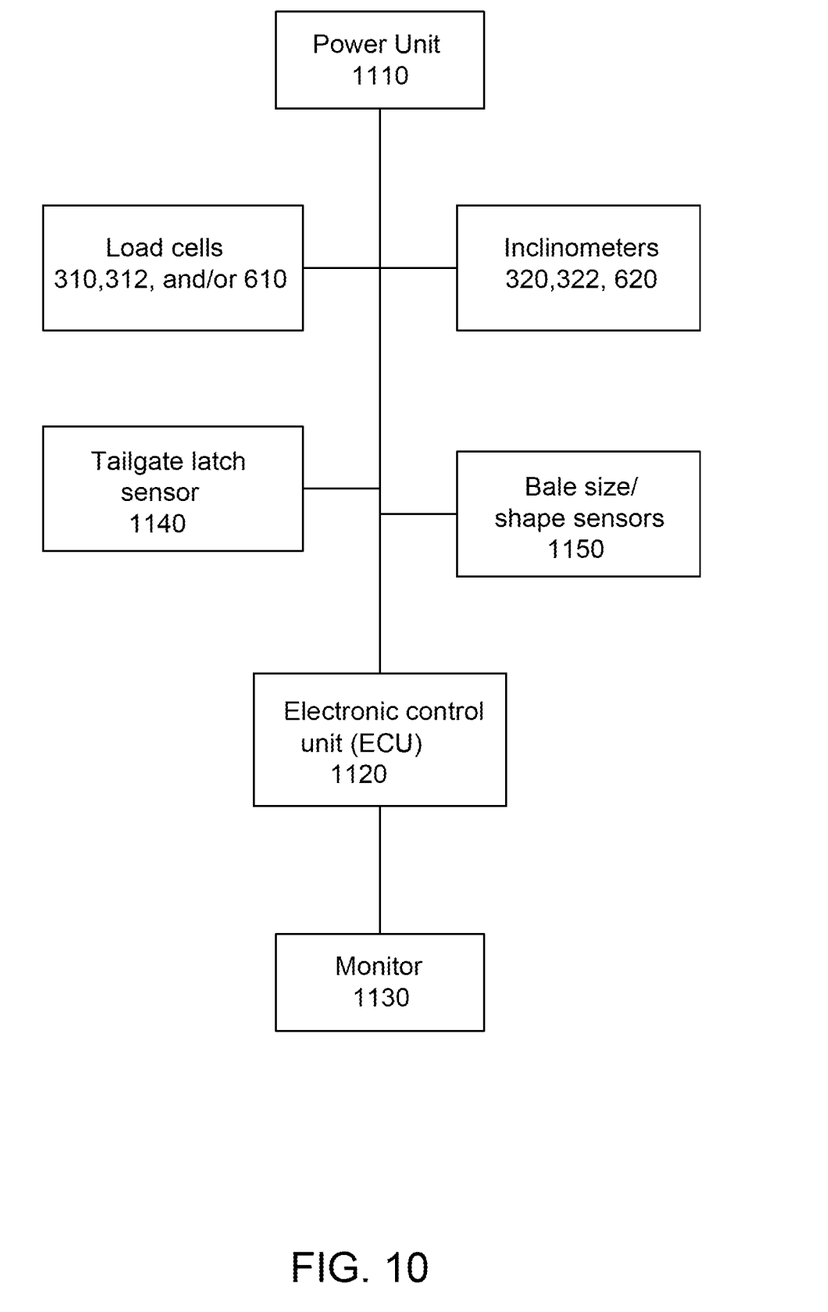
FIG. 10 is a block diagram of components utilized for weighing a round bale, according to an embodiment.

FIG. 10 is a block diagram of the components for weighing a bale 200. A power unit 1110 may provide power to one or more of the other components, including the load cells 310, 312, and 610; the inclinometers 320, 322, and 620; an electronic control unit (ECU) 1120; a monitor 1130; a tailgate latch sensor 1140; and bale shape/size sensors 1150.

The ECU 1120 may be a processing device, computing device, processor, or the like for performing calculations and operations described herein. The ECU 1120 may perform calculations related to the correction factor, angles a and b, and the weight of the bale 200. The ECU 1120 may also operate to move the tailgate 21 to the various positions for obtaining the measurements Fx1, Fx2, Fy1, Fy2, Fz1, and Fz2; Fx, Fy, and Fz; and the forward-to-reverse angle a and side-to-side angle b of the baler 10.

The ECU 1120 interfaces with the load cells 310, 312, and 610; the inclinometers 320, 322, and 620; the monitor 1130; the tailgate latch sensor 1140; the bale shape/size sensors 1150; and the power unit 1110. The ECU 1120 may also interface with one or more memory devices (not shown) such as read only memory (ROM), random access memory (RAM), and one or more optional non-transitory memory devices such as, for example, an external or internal DVD drive, a CD ROM drive, a hard drive, flash memory, a USB drive, or the like. The memory devices may be configured to include individual files and/or one or more databases for storing any software modules, instructions, or data. The memory devices may store predetermined information and date related to the correction factors, for example.

Program instructions, software, or interactive modules for performing any of the functional steps associated with the processes as described above may be stored in the ROM and/or the RAM. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

A display interface may permit information from the ECU 1120 to be displayed on the monitor 1130 in audio, visual, graphic, and/or alphanumeric format. For example, the monitor 1130 may be positioned in a cab utilized by the operator of the baling process so that the operator may safely and conveniently see the information during and after operation, such as the weight measurements of the bale 200. Communication with external devices may occur using various communication ports that may be attached to one or more communications networks, such as the Internet or a local area network, or directly to a portable computing device such as a notebook computer. An interface may allow for receipt of data from input devices such as a keyboard, a mouse, a joystick, a touch screen, a remote control, a pointing device, a video input device, an audio input device, and the like accessible by the operator.

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A method of weighing a bale formed by a baler, the method comprising:
   obtaining one or more bale weight measurements, with one or more load sensors, of the baler with a formed bale contained therein, a first of the one or more load sensors being positioned at a first wheel axle of the baler, and a second of the one or more load sensors being positioned at a second wheel axle of the baler;
   obtaining one or more empty baler weight measurements, with the one or more load sensors, of the baler empty; and
   determining, by a processing unit in communication with the one or more load sensors, a corrected bale weight by adjusting a first bale weight, the first bale weight being a function of the one or more bale weight measurements and the one or more empty baler weight measurements;
   wherein the first bale weight is adjusted based upon a front-to-back angle and a side-to-side angle of the baler, wherein the method further comprises obtaining the front-to-back angle and the side-to-side angle of the baler with respective inclinometers, the inclinometers in communication with the processing unit.

2. The method of claim 1, wherein the one or more bale weight measurements and the one or more empty baler weight measurements are obtained at fewer than each support position of the baler.

3. The method of claim 1, wherein the one or more bale weight measurements are obtained during a wrap cycle of the formed bale.

4. The method of claim 1, wherein the one or more empty baler weight measurements are obtained during a tailgate close cycle.

5. The method of claim 1, wherein the corrected bale weight is determined by adjusting the first bale weight based upon the front-to-back angle and the side-to-side angle of the baler and the size of the bale; and wherein the size of the bale is a function of a center of gravity location of the bale.

6. The method of claim 1, wherein the one or more load sensors comprises a single load sensor positioned at one of a first wheel axle or a second wheel axle of the baler, wherein the method further comprises:
 obtaining the front-to-back angle with an: inclinometer in communication with the processing unit; and
 obtaining the side-to-side angle based upon the empty baler weight measurements in which a tailgate of the baler is in two known positions.

7. The method of claim 6, wherein the corrected bale weight is determined by adjusting the first bale weight based upon the front-to-back angle and the side-to-side angle of the baler, the size of the bale, and the shape of the bale;
 wherein the size of the bale is a function of a center of gravity location of the bale;
 and wherein the shape of the bale is a function of the density of the bale at more than one bate shape sensor positioned in the baler.

8. The method of claim 1, further comprising:
 displaying on a monitor, via a display interface connected to the processing unit, an indication of the corrected bale weight.

9. A method of weighing a bale formed by a baler, the method comprising:
 Obtaining, with one or more load sensors, one or more bale weight measurements of the baler, with a formed bale contained therein;
 obtaining one or more empty baler weight measurements, with the one or more load sensors, of the baler empty; and
 determining, by a processing unit in communication with the one or more load sensors, a corrected bale weight by adjusting a first bale weight of the bale, the first bale weight being a function of the one or more bale weight measurements and the one or more empty baler weight measurements based upon a front-to-reverse slope and a side-to-side slope of a surface on which the baler is positioned and a correction factor based upon one or more of (i) a size of the bale; and (ii) a side-to-side shape of the bale, wherein a first of the one or more load sensors is positioned at a first wheel axle of the baler, and a second of the one or more load sensors is positioned at a second wheel axle of the baler, wherein the method further comprises obtaining the front-to-reverse slope and the side-to-side slope with respective inclinometers, the inclinometers in communication with the processing unit.

10. The method of claim 9, wherein the one or more bale weight measurements are obtained during a wrap cycle of the formed bale.

11. The method of claim 9, wherein the one or more empty baler weight measurements are obtained during a tailgate close cycle.

12. The method of claim 9, wherein the corrected bale weight is determined by adjusting the first bale weight based upon the front-to-reverse slope and the side-to-side slope of the baler and the size of the bale; and wherein the size of the bale is a function of a center of gravity location of the bale.

13. A method of weighing a bale formed by a baler, the method comprising:
 obtaining one or more bale weight measurements, with one or more load sensors each positioned at a respective wheel axle of the baler with a formed bale contained therein;
 obtaining one or more empty baler weight measurements, with the one or more load sensors, of the baler empty; and
 determining, by a processing unit in communication with the one or more load sensors a corrected bale weight by adjusting a first bale weight of the bale the first bale weight is a function of the one or more bale weight measurements and the one or more empty baler weight measurements based upon a front-to-reverse slope and a side-to-side slope of a surface on which the baler is positioned and a correction factor based upon one or more of (i) a size of the bale; and (ii) a side-to-side shape of the bale; and
 wherein the one or more load sensors comprises a single load sensor positioned at one of a first wheel axle or a second wheel axle of the baler, wherein the method further comprises:
 obtaining the front-to-reverse slope with an inclinometer in communication with the processing unit; and
 obtaining the side-to-side slope based upon the empty baler weight measurements in which a tailgate of the baler is in two known positions.

14. The method of claim 13, wherein the corrected bale weight is determined by adjusting the first bale weight based upon the front-to-reverse slope and the side-to-side slope of the baler, the size of the bale, and the shape of the bale; wherein the size of the bale is a function of a center of gravity location of the bale; and wherein the shape of the bale is a function of the density of the bale at more than one bale shape sensor positioned in the baler.

15. The method of claim 9, further comprising:
 displaying on a monitor, via a display interface connected to the processing unit, an indication of the corrected bale weight.

\* \* \* \* \*